(12) United States Patent
Sakamoto

(10) Patent No.: US 12,068,665 B2
(45) Date of Patent: Aug. 20, 2024

(54) MOTOR COIL COOLING STRUCTURE

(71) Applicant: TOYOTA JIDOSHA KABUSHIKI KAISHA, Aichi-ken (JP)

(72) Inventor: Hironobu Sakamoto, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 362 days.

(21) Appl. No.: 17/567,811

(22) Filed: Jan. 3, 2022

(65) Prior Publication Data

US 2022/0224201 A1 Jul. 14, 2022

(30) Foreign Application Priority Data

Jan. 8, 2021 (JP) ................................. 2021-002216

(51) Int. Cl.
*H02K 9/19* (2006.01)
*H02K 1/16* (2006.01)

(52) U.S. Cl.
CPC .................. *H02K 9/19* (2013.01); *H02K 1/16* (2013.01)

(58) Field of Classification Search
CPC .................................... H02K 9/19; H02K 1/32
See application file for complete search history.

(56) References Cited

U.S. PATENT DOCUMENTS

| | | | |
|---|---|---|---|
| 2005/0151429 A1* | 7/2005 | Harada | H02K 3/24 310/54 |
| 2018/0205294 A1* | 7/2018 | Manabe et al. | H02K 9/19 310/54 |
| 2019/0260271 A1 | 8/2019 | Inque | |
| 2022/0158522 A1* | 5/2022 | Ishikawa | H02K 5/203 310/54 |
| 2023/0246499 A1* | 8/2023 | Sridharan et al. | H02K 9/19 310/61 |

FOREIGN PATENT DOCUMENTS

JP 2019146388 A 8/2019

* cited by examiner

*Primary Examiner* — Michael Andrews
*Assistant Examiner* — Selim R Zoorob
(74) *Attorney, Agent, or Firm* — HAUPTMAN HAM, LLP

(57) ABSTRACT

A motor coil cooling structure, includes: a rotor core fixed to a rotation shaft having an internal supply path for coolant, and that includes a rotor-side flow path in communication with the supply path and passing through to a radial direction outer side of the rotor core; a stator core disposed at the rotor core so as to form a space between the stator core and the rotor core, and that includes slots each housing a coil; first flow paths formed so as to include the slots and pass through the stator core in a radial direction; second flow paths formed in an upper portion of the stator core relative to the rotation shaft, including the slots, extending in a radial direction and passing through the stator core only at a radial direction outer circumferential side thereof; and a supply section that supplies coolant from above the stator core.

5 Claims, 6 Drawing Sheets

MOTOR COIL COOLING STRUCTURE

CROSS-REFERENCE TO RELATED APPLICATION

This application is based on and claims priority under 35 USC 119 from Japanese Patent Application No. 2021-002216 filed on Jan. 8, 2021, the disclosure of which is incorporated by reference herein.

BACKGROUND

Technical Field

The present disclosure relates to a motor coil cooling structure.

Related Art

Japanese Patent Application Laid-Open (JP-A) No. 2019-146388 discloses a structure for cooling coils housed in plural slots formed arrayed around a circumferential direction of a stator core of a motor. The motor includes a rotor core capable of rotating integrally with a rotation shaft, and the stator core provided opposing an outer peripheral portion of the rotor core. In the technology disclosed in JP-A No. 2019-146388, slot openings that are in communication with the plural slots extend along a rotation-axial direction at an inner peripheral face of the stator core, and the coils are directly cooled by oil flowing through the slot openings and along the respective slots.

However, accompanying advances in motor rotation speed and electromagnetic density (increased current), there is a demand to directly and uniformly cool coils disposed in slots formed in the stator core in an efficient manner. There is therefore room for improvement of coil cooling structures in this respect.

SUMMARY

The present disclosure provides a motor coil cooling structure capable of directly and uniformly cooling coils disposed in slots formed in a stator in an efficient manner.

A first aspect of the present disclosure is a motor coil cooling structure including a rotor core that is fixed to an outer circumference of a rotation shaft provided with an internal supply path through which coolant flows, and that includes a rotor-side flow path in communication with the supply path and passing through to a radial direction outer side of the rotor core; a stator core that is disposed at the radial direction outer side of the rotor core so as to form a space between the stator core and the rotor core, and that includes plural slots arrayed around a circumferential direction, each of the plural slots housing a coil; plural first flow paths that are formed in the stator core so as to include the slots and pass through the stator core in a radial direction; plural second flow paths that are formed in an upper portion of the stator core relative to the rotation shaft when an axial direction of the rotation shaft is disposed along a horizontal direction, the plural second flow paths being formed so as to include the slots and extend in a radial direction through the stator core, and passing through the stator core only at a radial direction outer circumferential side thereof; and a supply section configured to supply coolant from above the stator core when the axial direction of the rotation shaft is disposed along the horizontal direction.

The motor coil cooling structure of the above aspect includes the rotor core that is fixed to the outer circumference of the rotation shaft provided with the internal supply path through which the coolant flows, and that includes the rotor-side flow path in communication with the supply path and passing through (or penetrating) the radial direction outside of the rotor core, the stator core that is disposed at the radial direction outside of the rotor core so as to form a space between the stator core and the rotor core, and that houses the coils in the plural slots formed arrayed around the circumferential direction, and the plural first flow paths that are formed in the stator core so as to include the slots and pass through (or penetrate) the stator core in the radial direction. Accordingly, centrifugal force causes the coolant flowing through the supply path to be supplied into the plural first flow paths after passing through the rotor-side flow path. The coolant accordingly flows directly into each of the plural slots, thereby enabling the coils to be directly cooled. Such direct cooling of the coils enables efficient cooling of the coils.

Generally, when a vehicle is stationary and the motor has been switched off, the coolant drops under its own weight into an oil pan disposed below the motor. Thus, when the vehicle is restarted after a substantial amount of time has elapsed since the motor was switched off, the motor is actuated in a state in which the first flow paths in the stator core are filled with air. Note that in cases in which the motor is mounted transversely (i.e., in cases in which the axial direction of the rotation shaft is disposed in a horizontal direction), the coolant readily passes through and out of the first flow paths in the stator core at both side portions and a lower portion of the motor as a result of centrifugal force of the rotating rotor and the weight of the coolant itself. However, the coolant less readily passes through and out of the first flow paths in the stator core under its own weight at an upper portion of the motor.

In other words, in cases in which air remains above the coolant in the respective first flow paths in an upper portion of the stator core, an expulsion pressure directed from the radial direction inner side toward the first flow paths is required in order to expel this remaining air. However, it would be difficult to discharge this air with only the amount of coolant supplied as a result of the centrifugal force of the rotating rotor when the vehicle is restarted.

As it is difficult for the coolant to pass through and out of the first flow paths in the stator core at the upper portion of the motor, when, for example, the motor is subjected to a large travel load when the vehicle is restarted, the upper portion of the stator core is liable to undergo localized heating where the coolant cannot pass through and out readily, with the result that it may not be possible to achieve a uniform temperature distribution in the stator core.

The motor coil cooling structure of the present aspect includes the plural second flow paths that are formed in the portion of the stator core that is higher than the rotation shaft when the axial direction of the rotation shaft is disposed along the horizontal direction. Each of the plural second flow paths is formed so as to include the slot and extends in a radial direction through the stator core, and only passes through (or penetrates) the radial direction outer circumferential side of the stator core. The motor coil cooling structure also includes the supply section that supplies the coolant to the stator core from above when the axial direction of the rotation shaft is disposed along the horizontal direction. Accordingly, the coolant supplied from above the stator core is supplied into the second flow paths from the radial direction outer circumferential side. This enables the coolant to flow directly from the upper side to the lower side in the slots in the portion of the stator core higher than the rotation shaft, enabling the corresponding coils to directly and efficiently cooled.

As described above, the coils at the upper portion of the stator core may be efficiently cooled using both the first flow paths and the second flow paths, thereby enabling a uniform temperature distribution to be achieved in the stator core.

In the above aspect, configuration may be made wherein the second flow paths are formed on both sides of the respective first flow paths in the axial direction; and the motor coil cooling structure further includes one or more third flow paths formed within the stator core so as to place the second flow paths formed on respective sides of the corresponding first flow path in communication with each other.

The configuration described above further includes the one or more third flow paths formed within the stator core so as to place the second flow paths in communication with each other. The coolant accordingly flows through the plural second flow paths and the third flow paths, thereby facilitating circulation of the coolant within the stator core.

In the above aspect, configuration may be made wherein at least one third flow path of the one or more third flow paths passes through the stator core in the axial direction.

In the configuration described above, the at least one third flow path of the one or more third flow paths passes through (or penetrates) the stator core in the axial direction such that the coolant is discharged in the axial direction of the third flow path, thereby enabling the coolant to be even more efficiently circulated.

In the above aspect, configuration may be made wherein the coil includes two coil ends, each configuring a location jutting out from respective axial direction ends of the stator core; and of the one or more third flow paths, a third flow path positioned above the coil ends when the axial direction of the rotation shaft is disposed along the horizontal direction passes through the stator core in the axial direction.

In the configuration described above, the third flow path positioned above the coil ends passes through (or penetrates) the stator core in the axial direction. Thus, coolant passing through the third flow path positioned above the coil ends is discharged through a discharge port of the third flow path positioned above the coil ends. The coolant discharged through the discharge port accordingly flows toward the coil ends under its own weight, thereby enabling the coil ends to be cooled by this coolant.

In the above aspect, configuration may be made wherein the coil includes two coil ends, each configuring a location jutting out from respective axial direction ends of the stator core; and of the one or more third flow paths, a third flow path positioned below the coil ends when the axial direction of the rotation shaft is disposed along a horizontal direction passes through the stator core in the axial direction.

In the configuration described above, the third flow path positioned below the coil ends passes through (or penetrates) the stator core in the axial direction. Thus, coolant that has passed through the second flow paths is discharged through a discharge port of the third flow path positioned below the coil ends. This promotes the passage of fresh coolant supplied from the supply section into the second flow paths, thereby enabling cooling efficiency to be improved.

In the above aspect, configuration may be made wherein the plural first flow paths are provided at a central portion, in an axial direction, of the stator core.

In order to achieve a uniform temperature distribution in the stator core, it would for example be conceivable to provide a greater number of the first flow paths in an upper portion of the stator core. However, the greater the number of radially penetrating first flow paths that are provided, the smaller the amount of coolant available for each of the first flow paths, such that it becomes difficult to secure the aforementioned expulsion pressure. In the configuration described above, the first flow paths are provided at the axial direction central portion of the stator core where heat is generally liable to build up and cause the coils to become hot. This enables the coils to be efficiently cooled using a smaller number of the first flow paths.

As described above, the present disclosure is capable of directly and uniformly cooling the coils disposed in the slots formed in the stator in an efficient manner.

DETAILED DESCRIPTION

Detailed explanation follows regarding a first exemplary embodiment according to the present disclosure, with reference to FIG. 1 to FIG. 5. Note that to aid explanation, in FIG. 1, the arrow UP indicates an upward direction with respect to a motor 12, and a direction perpendicular to the page surface corresponds to an axial direction of a rotation shaft 14 of the motor 12. Namely, the motor 12 according to the present exemplary embodiment is mounted transversely in a vehicle (i.e., disposed such that the axial direction of the rotation shaft 14 runs along a horizontal direction). Moreover, to aid explanation, the arrow D in FIG. 2 indicates the axial direction of the rotation shaft.

Figure 1:
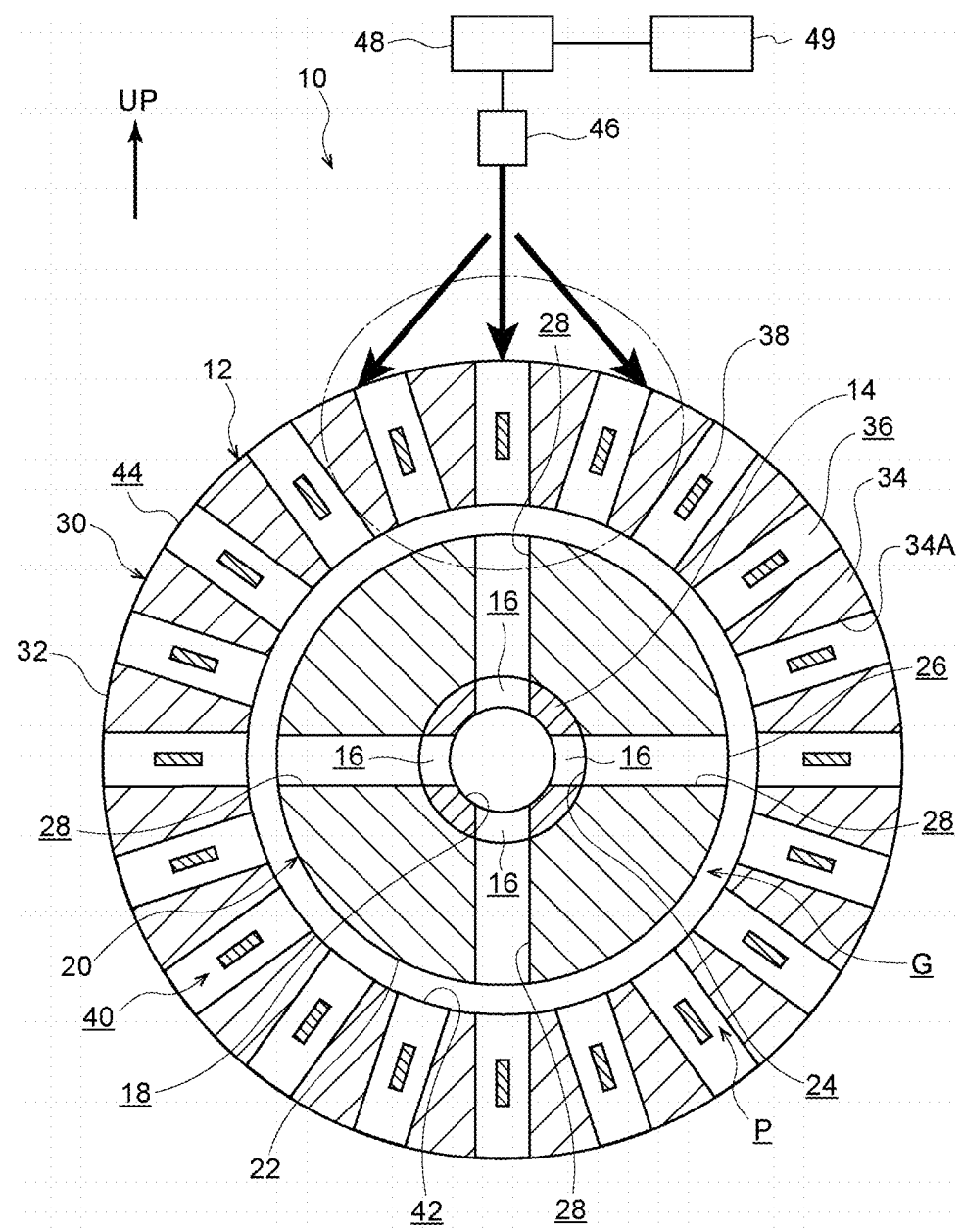
FIG. 1 is a cross-section illustrating an axial direction central portion of a motor structure according to a first exemplary embodiment.
Figure 2:
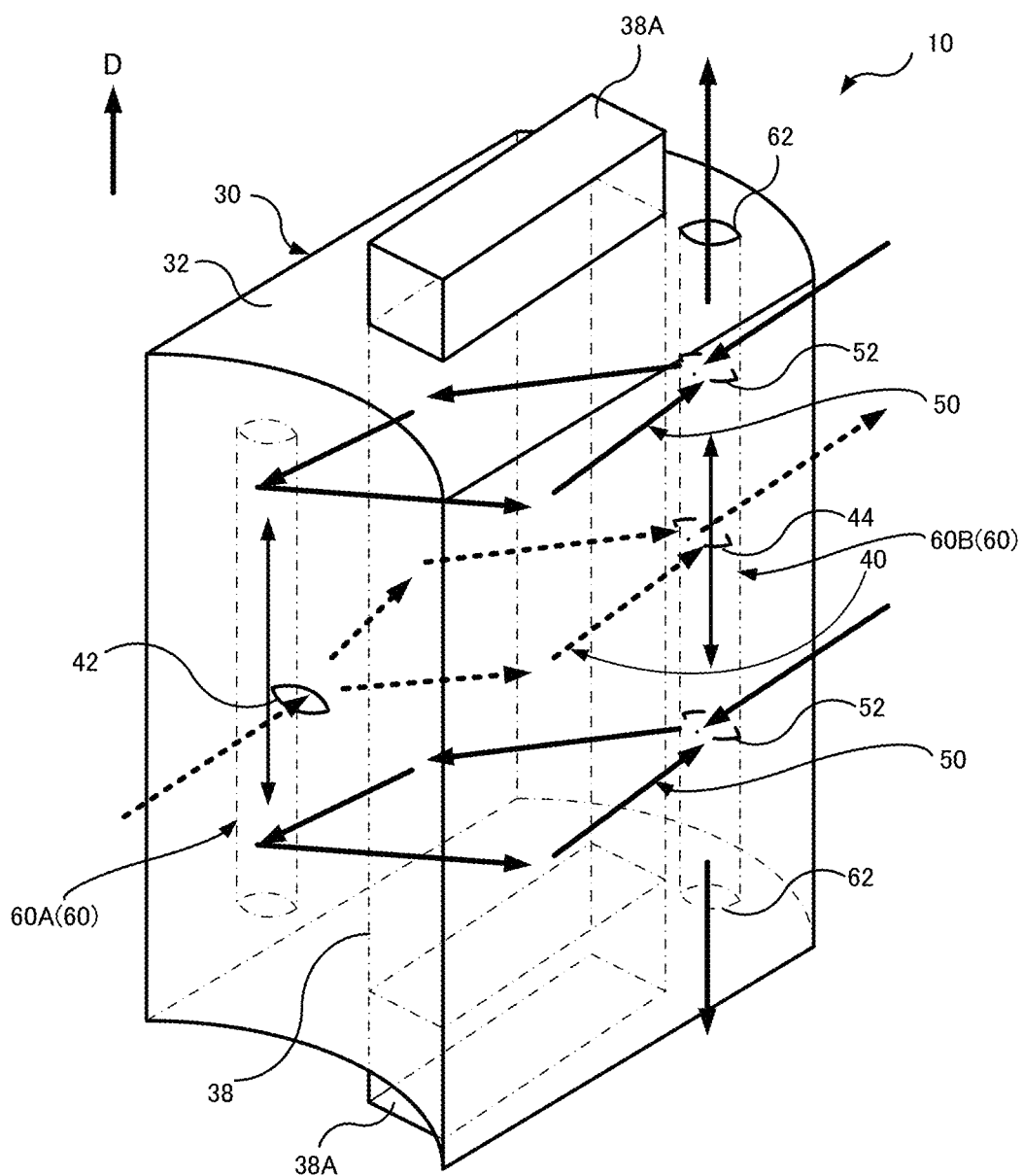
FIG. 2 is a perspective view locally illustrating a structure of a stator according to the first exemplary embodiment.
Figure 3:
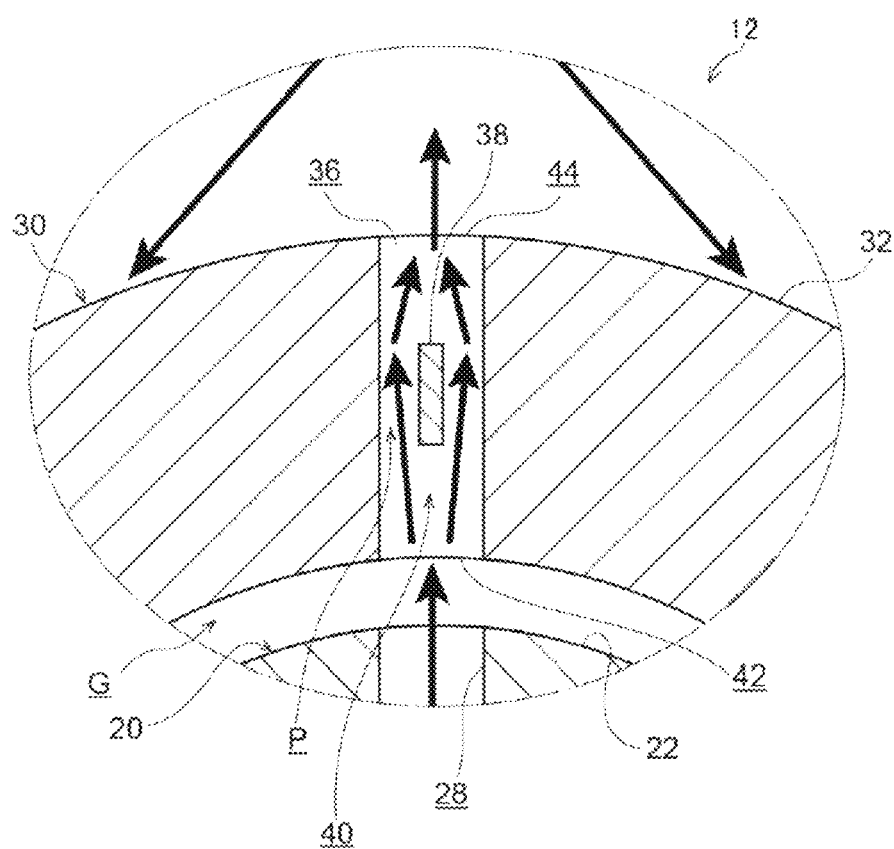
FIG. 3 is an enlarged cross-section of relevant portions appearing in FIG. 1, illustrating a flow of cooling oil after rotation of a motor according to the first exemplary embodiment.
Figure 4:
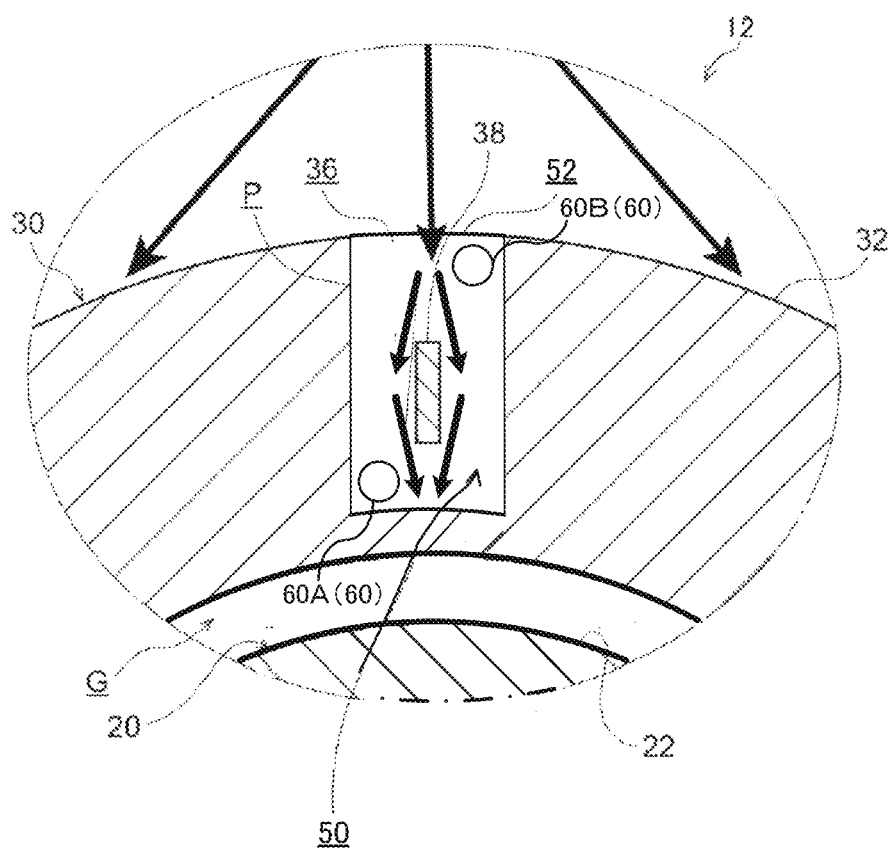
FIG. 4 is an enlarged cross-section of relevant portions, illustrating a flow of cooling oil after rotation at an axial direction upper portion and lower portion of a motor structure according to the first exemplary embodiment.

Also to aid explanation, in FIG. 1, FIG. 3, and FIG. 4, coils 38 are illustrated somewhat smaller than in reality, whereas gaps P between slots 36 and the coils 38 (first flow paths 40 and second flow paths 50) are illustrated larger somewhat than in reality. Also to aid explanation, in FIG. 1 to FIG. 4, cooling oil is represented by arrows, and the flow of the cooling oil along the respective flow paths is also represented by arrows.

A coil cooling structure 10 of the motor 12 according to the first exemplary embodiment is employed in a motor installed in a vehicle such as a hybrid vehicle or an electric vehicle (not illustrated in the drawings). The motor 12 is employed as a source of motive force in the vehicle. As illustrated in FIG. 1, the motor 12 according to the first exemplary embodiment includes a substantially circular cylinder shaped rotor 20 fixed to an outer circumferential face of the circular cylindrical rotation shaft 14 so as to rotate integrally with the rotation shaft 14, and a substantially annular stator 30 disposed at a radial direction outer side of the rotor 20 with a space G therebetween.

The rotor 20 includes a circular cylinder shaped rotor core 22, and plural permanent magnets (not illustrated in the drawings) internally provided to the rotor core 22. The stator 30 includes a stator core 32 configured by an annular magnetic body, and the coils 38 provided to the stator core 32. Note that the rotor core 22 and the stator core 32 are each formed by, for example, stacking plural punched electromagnetic steel plates along the axial direction of the rotation shaft 14 so as to form an integral unit.

Attraction force and repulsion force arising due to a rotating magnetic field generated by the coils 38 acts on the plural permanent magnets so as to cause the rotor core 22 (or rotor 20) to rotate in one direction about the rotation shaft 14. As previously mentioned, an outer circumferential face of the rotor core 22 and an inner circumferential face of the stator core 32 oppose each other in a radial direction across the space G. The space G has a predetermined width (namely, has a constant radial direction width).

A supply path 18 through which cooling oil serving as a coolant flows is formed extending through the interior of the rotation shaft 14 in the axial direction. The supply path 18 is connected to a supply device 48 serving as a supply section for supplying the cooling oil. Plural (for example four) circular openings 16, serving as cooling oil outlets, are formed in the outer circumferential face of the rotation shaft 14 at an axial direction central portion of the rotation shaft 14.

Plural (for example four) branch flow paths 28, serving as rotor-side flow paths into which the cooling oil flows from the supply path 18 via the openings 16, are formed in inner portions of the rotor core 22. The respective branch flow paths 28 are configured by through-holes with circular cross-section profiles formed by punching the electromagnetic steel plates configuring the rotor core 22. As a result, plural circular openings 24, 26 (for example four of each), serving as inlets and outlets (of the branch flow paths 28) for the cooling oil, are respectively formed in an inner circumferential face and an outer circumferential face of an axial direction central portion of the rotor core 22.

Namely, the respective branch flow paths 28 pass through or penetrate the rotor core 22 in radial directions (in a radiating pattern), such that the openings 16 in the rotation shaft 14 and the openings 24 in the rotor core 22 are in communication with each other. Thus, a centrifugal force arising as the rotor 20 rotates causes the cooling oil to flow from the supply path 18 into the respective branch flow paths 28, flow through the inside of the rotor core 22, and flow out to the space G. As a result, the rotor core 22 and the permanent magnets are cooled by the cooling oil.

Teeth 34 and the slots 36 extend along the axial direction, and are formed alternately around the circumferential direction of the stator core 32. Namely, in the stator core 32, plural (for example twenty) slots 36 are formed arranged around the circumferential direction, and the respective coils 38 are wound around the teeth 34 so as to be disposed in the slots 36. Two axial direction end portions of each of the coils 38 respectively project out from two axial direction end faces of the stator core 32. In the following explanation, these projecting portions are referred to as "coil ends 38A".

The respective coils 38 are electrically connected to a power source unit (not illustrated in the drawings), and a three-phase alternating current flows from this power source unit. The respective coils 38 generate the rotating magnetic field as a result. Insulating paper (not illustrated in the drawings) is stuffed into the gaps P between the slots 36 and the coils 38. Note that the insulating paper is not provided in the gaps P at an axial direction central portion of the stator core 32.

Namely, first flow paths 40 through which the cooling oil flows in order to cool the respective coils 38 are formed by the respective gaps P of the stator core 32 where the insulating paper is not provided. Specifically, grooves 34A extending along the axial direction are formed in the teeth 34 in order to configure the respective slots 36. As illustrated in FIG. 2 and FIG. 3, plural circular first openings 42, 44 (for example twenty of each) configuring inlets and outlets (of the first flow paths 40) for the cooling oil are thereby respectively formed in an inner circumferential face and at an outer circumferential face at the axial direction central portion of the stator core 32.

Namely, the respective first flow paths 40 formed at the axial direction central portion of the stator core 32 include the corresponding slots 36 (i.e., the corresponding gaps P) and each pass through or penetrate the stator core 32 in a radial direction (so as to form a radiating pattern). Thus, as illustrated in FIG. 2 and FIG. 3, the centrifugal force arising as the rotor 20 rotates causes cooling oil that has flowed into the space G to flow into the first flow paths 40 through the first openings 42, flow along the first flow paths 40, and flow out through the first openings 44. The coils 38 disposed in the slots 36 are thereby directly cooled by the cooling oil.

The cooling oil may also be supplied to the outer circumferential face of the stator core 32. Namely, as illustrated in FIG. 1, a shower pipe 46 capable of supplying cooling oil from above the stator core 32 is disposed at an upper side (namely, the radial direction outer side) of the stator core 32. The shower pipe 46 is connected to the supply device 48 that includes an oil pump (not illustrated in the drawings). Note that the shower pipe 46 functions as part of the supply device 48.

Driving of the oil pump of the supply device 48 is controlled by a control device 49 serving as a control unit installed in the vehicle. Cooling oil is supplied (i.e., sprinkled from above) onto an upper portion of the outer circumferential face of the stator core 32 under the control of the control device 49.

A section of the stator core 32 positioned above the rotation shaft 14 includes second flow paths 50 provided within the stator core 32. The second flow paths 50 are provided for cooling, out of the coils 38, plural (for example five) neighboring coils 38 around the circumferential direction, centered on the coil 38 positioned at the uppermost side. Note that insulating paper is not provided in the gaps P where the second flow paths 50 are formed.

As illustrated in FIG. 2, the second flow paths 50 are formed on both axial direction sides of the first flow paths 40 at locations corresponding to these five coils 38. As illustrated in FIG. 2 and FIG. 4, the second flow paths 50 are formed with plural circular second openings 52 serving as inlets for the cooling oil (into the second flow paths 50) in the outer circumferential face of the stator core 32. Namely, the second flow paths 50 formed in the stator core 32 each extend in a radial direction (so as to form a radiating pattern) through the stator core 32 including at the respective slots 36 (gaps P), and only pass through or penetrate the radial direction outer circumferential side (namely, the shower pipe 46 side) of the stator core 32. Namely, as illustrated in FIG. 4, in order to prevent backflow, the second flow paths 50 do not pass through or penetrate through to the rotor 20 side of the stator core 32.

Figure 5:
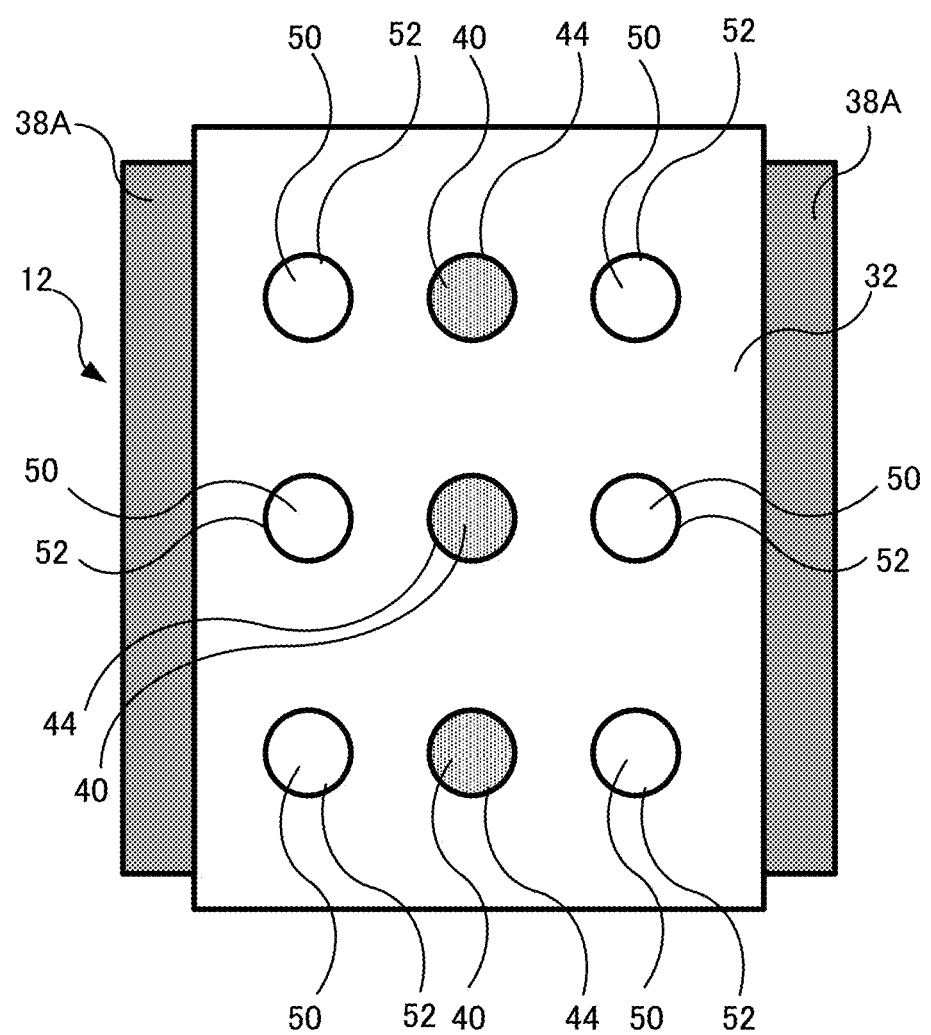
FIG. 5 is a top-down view of a motor according to the first exemplary embodiment.

As described above, the first flow paths 40 are formed at the axial direction central portion, and the second flow paths 50 are formed on both axial direction sides of the corresponding first flow paths 40. FIG. 5 is a top-down view of the motor 12. The arrow D in FIG. 5 indicates the axial direction of the rotation shaft 14. In FIG. 5, the first openings 44 of the first flow paths 40 are indicated by hatching in order to better distinguish them from the second openings 52 of the second flow paths 50. FIG. 5 is a diagram illustrating the stator 30 in FIG. 1 as viewed from above. Six of the second openings 52 of the second flow paths 50 are illustrated in the stator core 32 in FIG. 5. However, in the present exemplary embodiment, in reality the second openings 52 of the second flow paths 50 (second flow paths 50) are also provided on both axial direction sides of the non-illustrated first flow paths 40 adjacent to the not-illustrated first flow paths 40 located at the upper side and lower side of the page of FIG. 5, to give a total of ten of the second openings 52.

As illustrated in FIG. 5, the first openings 44 of the first flow paths 40 are formed at uniform intervals around the axial direction central portion of the outer circumferential face of the stator core 32. The second openings 52 of the second flow paths 50 are formed on both axial direction sides of the five circumferential-direction neighboring first openings 44 centered on the uppermost first opening 44.

As illustrated in FIG. 2 and FIG. 4, the stator core 32 includes two third flow paths 60 that place the second flow paths 50 formed on both axial direction sides of the corresponding first flow path 40 in communication with each other. The two third flow paths 60 are formed so as to extend along the axial direction within the stator core 32. The flow path provided on the radial direction side corresponding to the rotor 20 is referred to as a third flow path 60A, and the flow path provided on the outer circumferential side of the stator core 32 is referred to as a third flow path 60B. As illustrated in FIG. 2, the third flow path 60B, provided on the outer circumferential side penetrates the stator core 32 in the axial direction, is provided with circular discharge ports 62 in both axial direction end faces (i.e., coil end 38A sides) of the stator core 32. Note that the third flow paths 60 are flow paths formed so as to be in communication with the corresponding second flow paths 50, but not to be in communication with the corresponding first flow path 40.

Cooling oil supplied from the shower pipe 46 directly cools the stator core 32, and also directly cools the respective coils 38 disposed in the five circumferential-direction neighboring slots 36 centered on the coil 38 positioned on the uppermost side. Specifically, cooling oil supplied from the shower pipe 46 flows into the second flow paths 50 through the second openings 52 and circulates inside the second flow paths 50. Cooling oil that has flowed into the second flow paths 50 then flows into the third flow paths 60A, 60B, and circulates inside the second flow paths 50 and the third flow paths 60A, 60B. Cooling oil that has flowed into the third flow path 60B positioned on the outer circumferential side is discharged through the respective discharge ports 62. Thus, the outer circumferential face of the section of the stator core 32 positioned above the rotation shaft 14 and the respective coils 38 that are disposed in the five circumferential-direction neighboring slots 36 centered on the coil 38 positioned on the uppermost side are directly cooled by the cooling oil.

The coil cooling structure 10 of the motor 12 of the first exemplary embodiment is configured in the above manner. Next, explanation follows regarding operation and effects of the coil cooling structure 10 of the motor 12 configured in the above manner.

After the vehicle has become stationary and the motor 12 has been switched off, the cooling oil drops under its own weight into an oil pan (not illustrated in the drawings) disposed below the motor 12. Thus, when the vehicle is restarted after a substantial amount of time has elapsed since the motor 12 was switched off, the motor 12 is actuated in a state in which the first flow paths 40 in the stator 30 are certain to be filled with air.

Note that in cases in which the motor 12 is disposed horizontally, cooling oil readily passes through and out of the first flow paths 40 in the stator 30 at two side portions and a lower portion of the motor 12 as a result of centrifugal force arising as the rotor 20 rotates, as well as the weight of the cooling oil itself. However, the cooling oil less readily passes through and out of the first flow paths 40 in the stator 30 under its own weight at an upper portion of the motor 12.

In other words, in cases in which air remains above the cooling oil inside the first flow paths 40 in the upper portion of the stator core 32, an expulsion pressure directed from the radial direction inside toward the inside of these first flow paths 40 is required in order to expel this remaining air. It would be difficult to discharge this air with only the amount of cooling oil supplied through the first openings 42 under the centrifugal force of the rotating rotor 20 when the vehicle is restarted.

As it is difficult for the cooling oil to pass through and out of the first flow paths 40 in the stator core 32 at the upper portion of the motor 12 as described above, cooling oil that has flowed out toward the upper side through the branch flow paths 28 of the rotor core 22 could pool in the space G between the rotor core 22 and the stator core 32 and be drew into the rotor 20 as the rotor 20 rotates, causing loss as a result of drag as the rotor 20 rotates.

Moreover, when the motor 12 is subjected to a large travel load when the vehicle is restarted, the upper portion of the stator core 32 is liable to undergo localized heating where the cooling oil cannot pass through and out readily, with the result that it may not be possible to achieve a uniform temperature distribution in the stator core 32.

However, the coil cooling structure 10 of the motor 12 according to the present exemplary embodiment includes the plural second flow paths 50 that are formed in the stator core 32 at positions above the rotation shaft 14 when the axial direction of the rotation shaft 14 is disposed along the horizontal direction. The second flow paths 50 each extend in a radial direction through the stator core 32 while including the slots 36, and only penetrate the radial direction outer circumferential side of the stator core 32. The coil cooling structure 10 also includes the supply device 48 that supplies cooling oil to the stator core 32 from above when the axial direction of the rotation shaft 14 is disposed along the horizontal direction. This enables cooling oil to be supplied from above the stator core 32 prior to the rotor 20 rotating, such that the supplied cooling oil flows (backflows) through the plural first openings 44 of the first flow paths 40 at the upper portion of the stator core 32 under its own weight. This cooling oil fills the inside of the first flow paths 40. Namely, any air inside the first flow paths 40 is pushed into the space G by the cooling oil so as to be discharged from the inside of the first flow paths 40 (i.e. the air is bled out from the first flow paths 40).

Since the cooling oil readily passes through and out of the first flow paths 40 at the upper portion of the stator 30 as a result, the coils 38 disposed in the slots 36 may be directly cooled in an efficient manner, and the occurrence of loss as a result of drag or the like as the rotor 20 rotates may be suppressed or prevented.

Moreover, cooling oil can also be supplied from above the stator core 32 as the rotor 20 rotates, and this cooling oil supplied from above the stator core 32 as the rotor 20 rotates is supplied into the second flow paths 50 through the second openings 52 provided on the radial direction outer circumferential face. Thus, coolant flows directly from the upper side to the lower side in the slots 36 in the section of the stator core 32 positioned above the rotation shaft 14, namely at the upper portion of the stator core 32, thereby enabling the corresponding coils 38 to be directly cooled in an efficient manner.

As described above, the coils 38 at the upper portion of the stator core 32 can be efficiently cooled using both the first flow paths 40 and the second flow paths 50, thereby enabling a uniform temperature distribution to be achieved in the stator core 32.

Moreover, in the coil cooling structure 10 of the motor 12 according to the first exemplary embodiment, the plural first flow paths 40 are provided at the axial direction central portion of the stator core 32. In order to achieve a uniform temperature distribution in the stator core 32, it would for example be conceivable to provide a greater number of the first flow paths 40 in the upper portion of the stator core 32. However, the greater the number of radially penetrating first flow paths 40 that are provided, the smaller the amount of cooling oil available for each of the first flow paths 40, such that it becomes difficult to secure the aforementioned expulsion pressure. In the coil cooling structure 10 of the motor 12 according to the first exemplary embodiment, the first flow paths 40 are provided at the axial direction central portion where heat is generally liable to build up and cause the coils to become hot. This enables the coils 38 to be efficiently cooled using a smaller number of the first flow paths 40.

Moreover, the coil cooling structure 10 of the motor 12 according to the first exemplary embodiment also includes the two third flow paths 60 that are formed in the stator core 32 and that place the corresponding second flow paths 50 in communication with each other. The cooling oil flows through the second flow paths 50 and the third flow paths 60, thereby facilitating circulation of cooling oil within the stator core 32.

Moreover, in the coil cooling structure 10 of the motor 12 according to the first exemplary embodiment, the third flow path 60B provided on the outer circumferential side penetrates the stator core 32 in the axial direction, such that cooling oil is discharged in the axial direction through the third flow path 60B. This enables the cooling oil to be even more efficiently circulated.

Moreover, in the coil cooling structure 10 of the motor 12 according to the first exemplary embodiment, the third flow path 60B provided on the outer circumferential side, namely the third flow path 60B positioned above the coil ends 38A penetrates the stator core 32 in the axial direction. Thus, cooling oil passing through the third flow path 60B positioned above the coil ends 38A is discharged through the discharge ports 62 of the third flow path 60B positioned above the coil ends 38A. The cooling oil discharged through the discharge ports 62 flows toward the coil ends 38A under its own weight, thereby enabling the coil ends 38A to be cooled by this cooling oil.

Note that although the third flow path 60B provided on the outer circumferential side, namely the third flow path 60B positioned above the coil ends 38A, penetrates the stator core 32 in the axial direction in the first exemplary embodiment, the present disclosure is not limited thereto.

Figure 6:
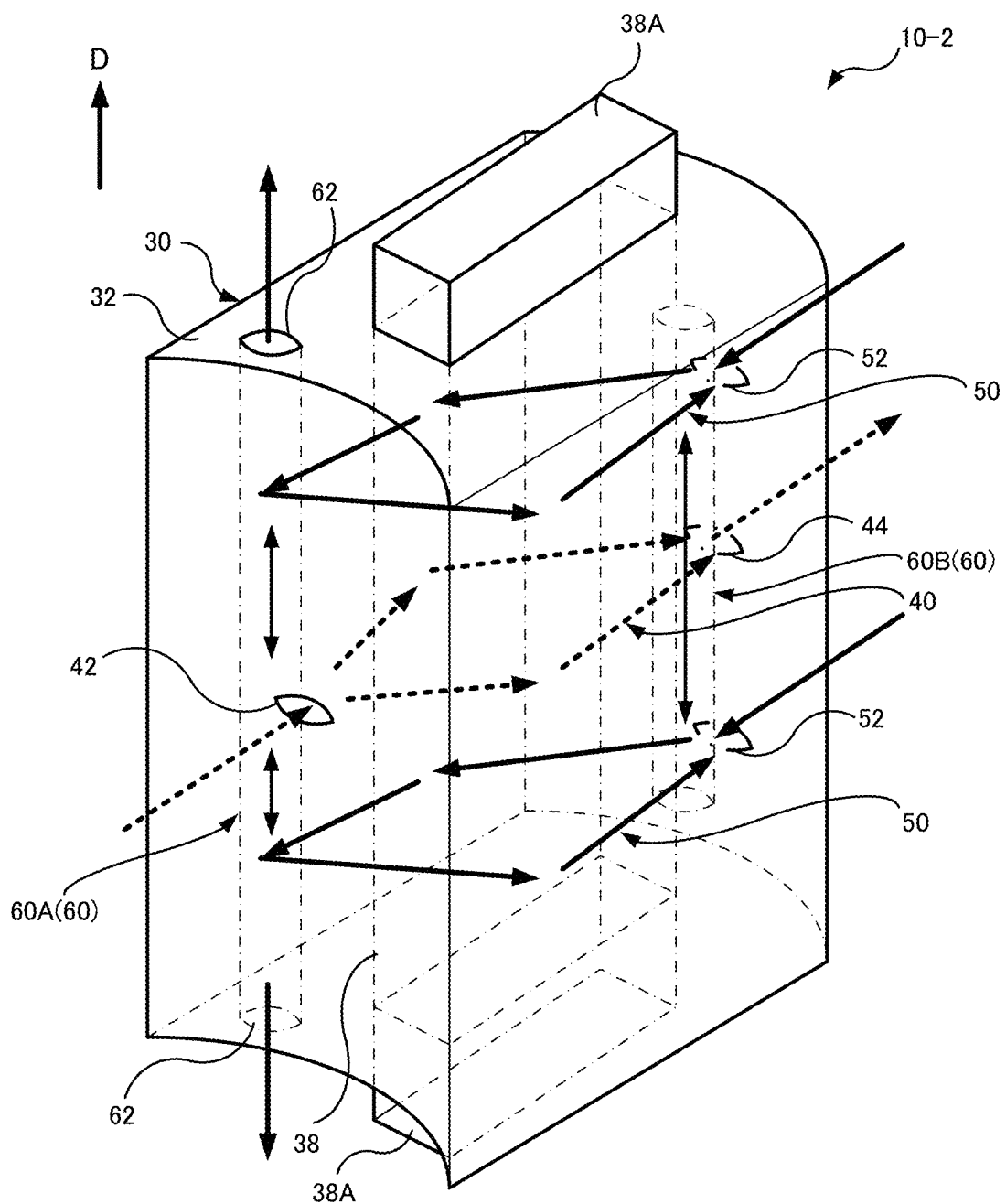
FIG. 6 is a perspective view locally illustrating a structure of a stator according to a second exemplary embodiment.

Next, detailed explanation follows regarding a second exemplary embodiment according to the present disclosure, with reference to FIG. 6. As illustrated in FIG. 6, in a coil cooling structure 10-2 of a motor 12 according to the second exemplary embodiment, the third flow path 60A provided on the side of the rotor 20 in the radial direction, namely the third flow path 60A provided below the coil ends 38A, penetrates the stator core 32 in the axial direction. Specifically, the third flow path 60A provided on the rotor 20 side is provided with circular discharge ports 62 similar to those illustrated in FIG. 2 at both axial direction ends (on the coil end 38A sides) of the stator core 32, such that the third flow path 60A penetrates the stator core 32 in the axial direction.

Thus, cooling oil that has passed through the second flow paths 50 is also discharged through the discharge ports 62 of the third flow path 60 positioned below the coil ends 38A. This promotes the passage of fresh cooling oil supplied into the second flow paths 50 from the supply device 48, thereby enabling cooling efficiency to be improved.

The coil cooling structures 10, 10-2 of the motor 12 according to the first exemplary embodiment and second exemplary embodiment have been described above with reference to the drawings. However, the coil cooling structures 10, 10-2 of the motor 12 according to the first exemplary embodiment and second exemplary embodiment are not limited to those illustrated in the drawings, and suitable design modifications may be implemented within a range not departing from the spirit of the present disclosure. For example, cooling oil is merely one example of a coolant, and a liquid coolant other than cooling oil may be employed to cool the coils 38 and the like.

Moreover, although an example has been given in which the respective openings 16, 24, 26, 42, 44, 52 and the discharge ports 62 are circular in shape, there is no limitation thereto, and these openings may formed in other shape, for example, be square in shape.

Although two of the third flow paths 60 are provided as an example, there is no limitation thereto, and for example three or more of the third flow paths 60 may be provided. Moreover, although an example has been given in which only one of the third flow paths 60 is provided so as to penetrate the stator core 32 in the axial direction, there is no limitation thereto, and configuration may be such that both or neither of the third flow paths 60 penetrate the stator core 32 in the axial direction. Moreover, there is no particular limitation to the route of the third flow paths 60 as long as the third flow paths 60 may be provided so as to place the plural second flow paths 50 in communication with each other without being in communication with the first flow paths 40.

What is claimed is:
1. A motor coil cooling structure, comprising:
a rotor core that is fixed to an outer circumference of a rotation shaft provided with an internal supply path through which coolant flows, and that includes a rotor-side flow path in communication with the internal supply path and passing through to a radial direction outer side of the rotor core;
a stator core that is disposed at the radial direction outer side of the rotor core so as to form a space between the stator core and the rotor core, and that includes a plurality of slots arrayed around a circumferential direction, each of the plurality of slots housing a coil;
a plurality of first flow paths that are formed in the stator core so as to include the slots and pass through the stator core in a radial direction;

a plurality of second flow paths that are formed in an upper portion of the stator core relative to the rotation shaft when an axial direction of the rotation shaft is disposed along a horizontal direction, the plurality of second flow paths being formed so as to include the slots and extend in a radial direction through the stator core, and passing through the stator core only at a radial direction outer circumferential side thereof; and a supply section configured to supply coolant from above the stator core when the axial direction of the rotation shaft is disposed along the horizontal direction, wherein the second flow paths are formed on both sides of the respective first flow paths in the axial direction, and the motor coil cooling structure further comprises one or more third flow paths formed within the stator core so as to place the second flow paths formed on respective sides of the corresponding first flow path in communication with each other.

2. The motor coil cooling structure of claim 1, wherein at least one third flow path of the one or more third flow paths passes through the stator core in the axial direction.

3. The motor coil cooling structure of claim 2, wherein:

the coil includes two coil ends, each configuring a location jutting out from respective axial direction ends of the stator core; and of the one or more third flow paths, a third flow path positioned above the coil ends when the axial direction of the rotation shaft is disposed along the horizontal direction passes through the stator core in the axial direction.

4. The motor coil cooling structure of claim 2, wherein:

the coil includes two coil ends, each configuring a location jutting out from respective axial direction ends of the stator core; and of the one or more third flow paths, a third flow path positioned below the coil ends when the axial direction of the rotation shaft is disposed along a horizontal direction passes through the stator core in the axial direction.

5. The motor coil cooling structure of claim 1, wherein the plurality of first flow paths are provided at a central portion, in the axial direction, of the stator core.

* * * * *